(12) United States Patent
Lisuwandi et al.

(10) Patent No.: US 11,394,301 B1
(45) Date of Patent: Jul. 19, 2022

(54) TECHNIQUES FOR LINEAR CONTROL OF INDUCTOR CURRENT SHUNT FOR MITIGATION OF LOAD DUMP TRANSIENTS IN DC-DC REGULATORS

(71) Applicant: Analog Devices, Inc., Wilmington, MA (US)

(72) Inventors: Eko Lisuwandi, Andover, MA (US); Jinhuang Lu, Andover, MA (US); Mark Robert Vitunic, Lexington, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/175,909

(22) Filed: Feb. 15, 2021

(51) Int. Cl.
  *H02M 3/158* (2006.01)
  *H02M 1/00* (2006.01)
  *H02M 3/156* (2006.01)

(52) U.S. Cl.
  CPC ........ *H02M 3/1582* (2013.01); *H02M 1/0009* (2021.05); *H02M 1/0016* (2021.05); *H02M 3/1566* (2021.05)

(58) Field of Classification Search
  CPC ............. H02M 1/0009; H02M 1/0016; H02M 3/1566; H02M 3/1582
  See application file for complete search history.

(56) References Cited

U.S. PATENT DOCUMENTS

| | | |
|---|---|---|
| 5,889,392 A | 3/1999 | Moore et al. |
| 6,229,289 B1 | 5/2001 | Piovaccari et al. |
| 6,717,389 B1 | 4/2004 | Johnson |
| 7,518,348 B1 | 4/2009 | Kobayashi |
| 7,948,720 B2 | 5/2011 | Mok et al. |
| 7,990,121 B2 | 8/2011 | Kojima et al. |
| 8,072,196 B1 | 12/2011 | Li |
| 8,169,205 B2 | 5/2012 | Chen et al. |
| 8,541,995 B2 | 9/2013 | Tang et al. |
| 8,988,054 B2 | 3/2015 | Marty |
| 8,994,347 B2 | 3/2015 | Galbis et al. |
| 9,541,933 B2 | 1/2017 | Knoedgen et al. |

(Continued)

FOREIGN PATENT DOCUMENTS

| | | |
|---|---|---|
| CN | 105634279 B | 3/2018 |
| CN | 105846678 B | 4/2018 |

*Primary Examiner* — Kyle J Moody
*Assistant Examiner* — Lakaisha Jackson
(74) *Attorney, Agent, or Firm* — Schwegman Lundberg & Woessner, P.A.

(57) ABSTRACT

For inductor-based DC-DC converters, a current shunt switch can provide an alternate path for the inductor current to flow that does not include the output capacitor. An amplifier circuit can be included and coupled with a control node of the current shunt switch to adjust a voltage on the control node to control an amount of inductor current diverted away from the output node. A fast linear loop can be included to ensure smooth transitions when engaging or disengaging the current shunt switch. These techniques can minimize the amount and duration of the subsequent negative output voltage excursion, which can be dependent on the specific ESL and ESR values of the output voltage capacitor, for the cases when the final value of the step-down load-transient is not zero. These techniques can improve a positive output voltage response caused by an output load transient in the negative direction.

21 Claims, 11 Drawing Sheets

(56) References Cited

U.S. PATENT DOCUMENTS

| | | |
|---|---|---|
| 9,768,691 B2 | 9/2017 | Ihs et al. |
| 9,780,661 B2 | 10/2017 | Chakraborty et al. |
| 9,804,621 B2 | 10/2017 | Dally |
| 9,871,447 B2 | 1/2018 | Jung et al. |
| 9,973,083 B1 | 5/2018 | Rose et al. |
| 10,763,668 B2 | 9/2020 | Huang et al. |
| 10,790,747 B1* | 9/2020 | Vitunic ................ H02M 1/088 |
| 11,070,137 B1* | 7/2021 | Carden ............. H02M 3/33561 |
| 2013/0193941 A1 | 8/2013 | Defazio |
| 2016/0359413 A1* | 12/2016 | Ihs .......................... H02M 1/08 |
| 2019/0288603 A1 | 9/2019 | Babazadeh et al. |

* cited by examiner

TECHNIQUES FOR LINEAR CONTROL OF INDUCTOR CURRENT SHUNT FOR MITIGATION OF LOAD DUMP TRANSIENTS IN DC-DC REGULATORS

FIELD OF THE DISCLOSURE

This document relates to regulator circuits and in particular to mitigating output transients in direct current to direct current (DC-DC) regulator circuits.

BACKGROUND

Regulator circuits can be used to generate a regulated output from a circuit input. For example, a buck voltage regulator circuit uses an input voltage to generate a regulated output voltage less than the input voltage, and a boost regulator circuit generates a regulated output voltage greater than the input voltage. Switching is used to charge and discharge an inductor of the circuits to produce a regulated output. In these types of circuits, and in non-inductor-based regulator circuits as well, an output load current transient may result in an undesirable voltage transient on the regulated output voltage.

SUMMARY OF THE DISCLOSURE

For inductor-based DC-DC converters, a current shunt switch can provide an alternate path for the inductor current to flow that does not include the output capacitor. An amplifier circuit can be included and coupled with a control node of the current shunt switch to adjust a voltage on the control node to control an amount of inductor current diverted away from the output node. A fast linear loop can be included to ensure smooth transitions when engaging or disengaging the current shunt switch. These techniques can minimize the amount and duration of the subsequent negative output voltage excursion, which can be dependent on the specific ESL and ESR values of the output voltage capacitor, for the cases when the final value of the step-down load-transient is not zero. These techniques can improve a positive output voltage response caused by an output load transient in the negative direction.

In some aspects, this disclosure is directed to a voltage regulator circuit comprising a switching circuit to adjust a switching duty cycle to regulate an output voltage at an output node of the voltage regulator circuit using an error signal representative of a difference between a target voltage value and the output voltage; an inductor coupled with the switching circuit and configured to provide an inductor current to the output node; a shunt circuit coupled in parallel to the inductor, the shunt circuit to divert the inductor current away from the output node when the output voltage exceeds a specified maximum output voltage, the shunt circuit including a shunt switch coupled in parallel to the inductor, the shunt switch including a control node; and a shunt circuit control circuit including an amplifier circuit and a comparator circuit, the amplifier circuit having an output coupled with the control node of the shunt switch, the comparator circuit to compare the output voltage to the specified maximum output voltage and a target voltage less than the specified maximum output voltage, enable the amplifier circuit when the output voltage exceeds the specified maximum output voltage to adjust a voltage on the control node of the shunt switch to control an amount of the inductor current diverted away from the output node, and disable the amplifier circuit after enabling the shunt switch when the output voltage decreases to the target voltage.

In some aspects, this disclosure is directed to a method of operating a voltage regulator circuit, the method comprising: activating and deactivating a switch circuit to charge and discharge an inductor to generate an output voltage and provide an inductor current to an output node of the voltage regulator circuit; adjusting a switching duty cycle of the switch circuit to regulate the output voltage using an error signal representative of a difference between a target voltage value and the output voltage; comparing the output voltage to a specified maximum output voltage; and adjusting, by using the comparison of the output voltage to the specified maximum output voltage, a voltage on a control node of a shunt switch to control an amount of the inductor current diverted away from the output node when the output voltage exceeds a specified maximum output voltage.

In some aspects, this disclosure is directed to a voltage regulator circuit comprising: a driver circuit to activate and deactivate a switch circuit to charge and discharge an inductor to generate an output voltage and provide an inductor current to an output node of the voltage regulator circuit, the driver circuit to regulate an output voltage at an output node of the voltage regulator circuit using an error signal representative of a difference between a target voltage value and the output voltage; means for comparing the output voltage to a specified maximum output voltage; and means for adjusting, by using the comparison of the output voltage to the specified maximum output voltage, a voltage on a control node of a shunt switch to control an amount of the inductor current diverted away from the output node when the output voltage exceeds a specified maximum output voltage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 2:
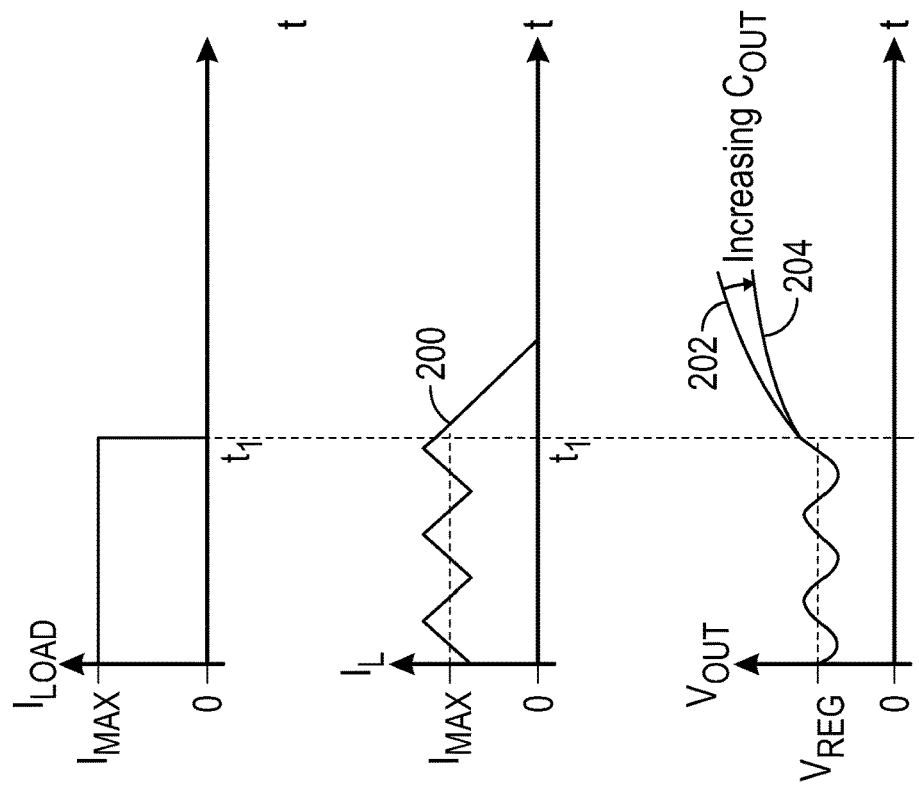
FIG. 2 illustrates current and voltage waveforms for the voltage regulator circuit of FIG. 1 when subjected to a load dump.

The techniques of this disclosure relate to DC-DC regulator topologies, e.g., buck, boost, and buck-boost, that utilize a single inductor. In each of these regulator topologies, and common to non-inductor-based regulators as well, an output load transient in the negative direction, e.g., a load dump, can result in a positive voltage transient on the regulated output voltage. This is due to a) the finite response time of the regulator to correct the amount of delivered current and b) the combined near-instantaneous effects of electrical series resistance (ESR) and electrical series inductance (ESL) in the output capacitor.

In the case of inductor-based DC-DC regulators, the problem of positive voltage transients on the regulated output voltage can be exacerbated due to the inductor current itself being unable to change instantly, and this current typically continues to be delivered to the output capacitor for additional cycles until it can be brought down to zero. This can cause the regulated output voltage to increase further, which risks violating tight output voltage specifications, causing a system shutdown due to tripping an overvoltage monitoring circuit, or in the worst case, damaging circuits connected to the output due to overvoltage stress. Some approaches attempt to limit the positive output voltage excursion by adding more output capacitance. A disadvantage of these approaches can be additional cost and additional physical board space of the capacitors.

In another approach, such as in commonly assigned U.S. Pat. No. 10,790,747 to Vitunic et al., which is incorporated herein by reference in its entirety, a current shunt switch can be implemented to provide an alternate path for the inductor current to flow that does not include the output capacitor. Such a configuration can further minimize any positive output voltage excursion.

The present inventors have recognized that, in some scenarios, the ESR (and the ESL) of the output capacitor can undesirably affect the performance of the current shunt switch solution of U.S. Pat. No. 10,790,747, which is described in more detail below. The present inventors have recognized that an amplifier circuit can be included and coupled with a control node of a current shunt switch. The amplifier circuit can adjust a voltage on the control node of the current shunt switch to control an amount of inductor current diverted away from the output node. Using various techniques of this disclosure, a fast linear loop can be included to ensure smooth transitions when engaging or disengaging the current shunt switch. These techniques can minimize the amount and duration of the subsequent negative output voltage excursion, which can be dependent on the specific ESL and ESR values of the output voltage capacitor, for the cases when the final value of the step-down load-transient is not zero. In this manner, the techniques of this disclosure can improve a positive output voltage response caused by an output load transient in the negative direction.

Figure 1:
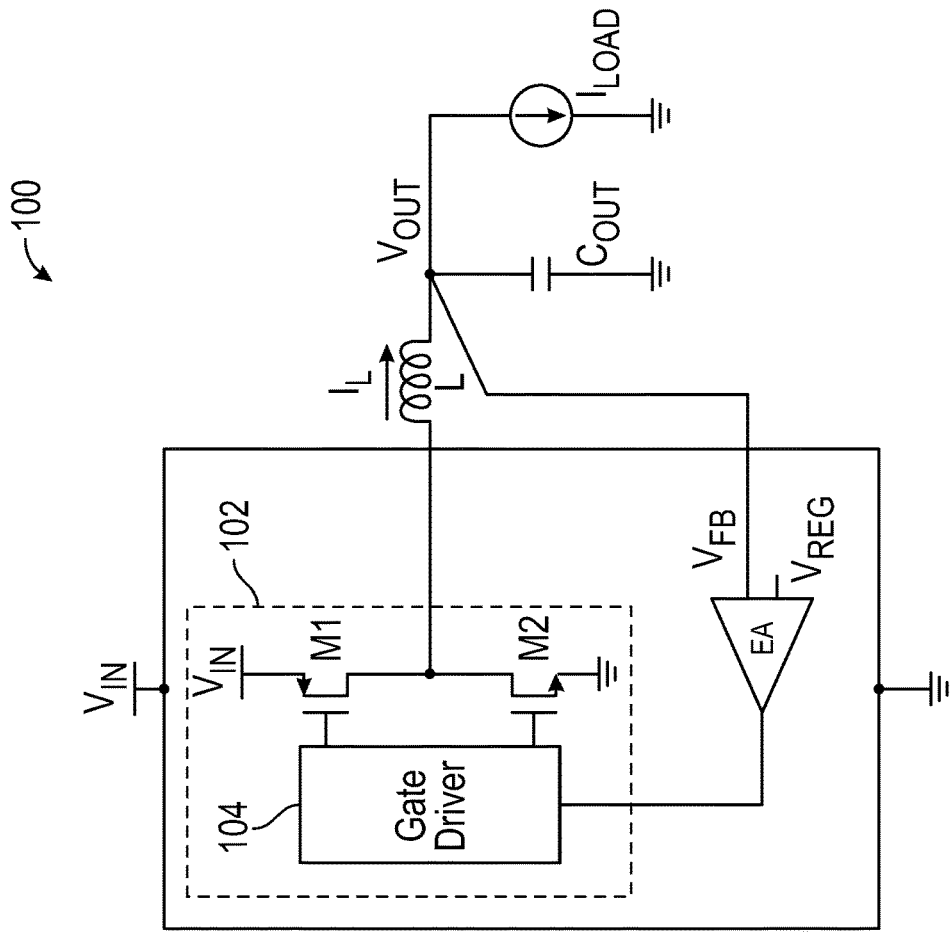
FIG. 1 is a schematic of an example of a voltage regulator circuit.

FIG. 1 is a schematic of an example of a voltage regulator circuit. The voltage regulator circuit 100 in FIG. 1 is a buck DC-DC regulator. The buck DC-DC regulator 100 can be powered from an input voltage $V_{IN}$ and its main components include transistors M1 and M2, an inductor L, an output capacitor $C_{OUT}$, and output load $I_{LOAD}$.

The voltage regulator circuit 100 includes a switching circuit 102 having a gate driver 104 and including the transistors M1 and M2. The gate driver 104 is configured (e.g., by logic circuitry) to use a clock signal to provide a switching duty cycle that includes a charge portion and a discharge portion. The voltage regulator circuit 100 receives electrical energy during the charge portion of the switching duty cycle.

The output voltage $V_{OUT}$ can be fed back to an error amplifier EA, which is part of the control loop regulating the output voltage $V_{OUT}$ to a DC value of $V_{REG}$. The error amplifier EA can sense the output voltage and adjust the duty cycle of the voltage regulator circuit 100 by turning the transistors M1 and M2 ON and OFF.

FIG. 2 illustrates current and voltage waveforms for the voltage regulator circuit 100 of FIG. 1 when subjected to a load dump. The top graph illustrates the load current $I_{LOAD}$ (y-axis) with respect to time (x-axis), the middle graph illustrates the inductor current $I_L$ (y-axis) of the inductor L in FIG. 1 with respect to time (x-axis), and the bottom graph illustrates the output voltage $V_{OUT}$ (y-axis) with respect to time (x-axis).

Just prior to the load dump event, the inductor current waveform, $I_L$, in the middle graph exhibits normal ripple at the DC-DC switching frequency, and the output voltage, $V_{OUT}$, exhibits a corresponding voltage ripple at the same frequency because $C_{OUT}$ is subject to the AC component of $I_L$ (because $I_{COUT}=I_L-I_{LOAD}$). After $t_1$, all inductor current 200 (including the DC component, $I_{MAX}$) is delivered to the output capacitor until the inductor current 200 can be brought down to zero. This is true regardless of whether the buck regulator control scheme turns M1 and M2 both OFF, or simply turns ON M2.

As shown in FIG. 2 in the bottom graph, the output voltage response to this extra current is a voltage overshoot 202. The amount of overshoot depends on the value of $C_{OUT}$ and higher $C_{OUT}$ values lead to reduced voltage overshoot 204. However, there is an increased cost in bill of materials (BOM) and board space associated with increasing the output capacitance. Additionally, because inductor current continues to be delivered to the output node, increasing the capacitance of $C_{OUT}$ does not eliminate the additional overshoot, it only lessens it.

To eliminate or limit the voltage overshoot, the inductor current can be diverted away from the output capacitor $C_{OUT}$ and the output node $V_{OUT}$. This allows for the inductor current to be brought down to zero with no further increase in the output voltage.

Figures 3, 4:
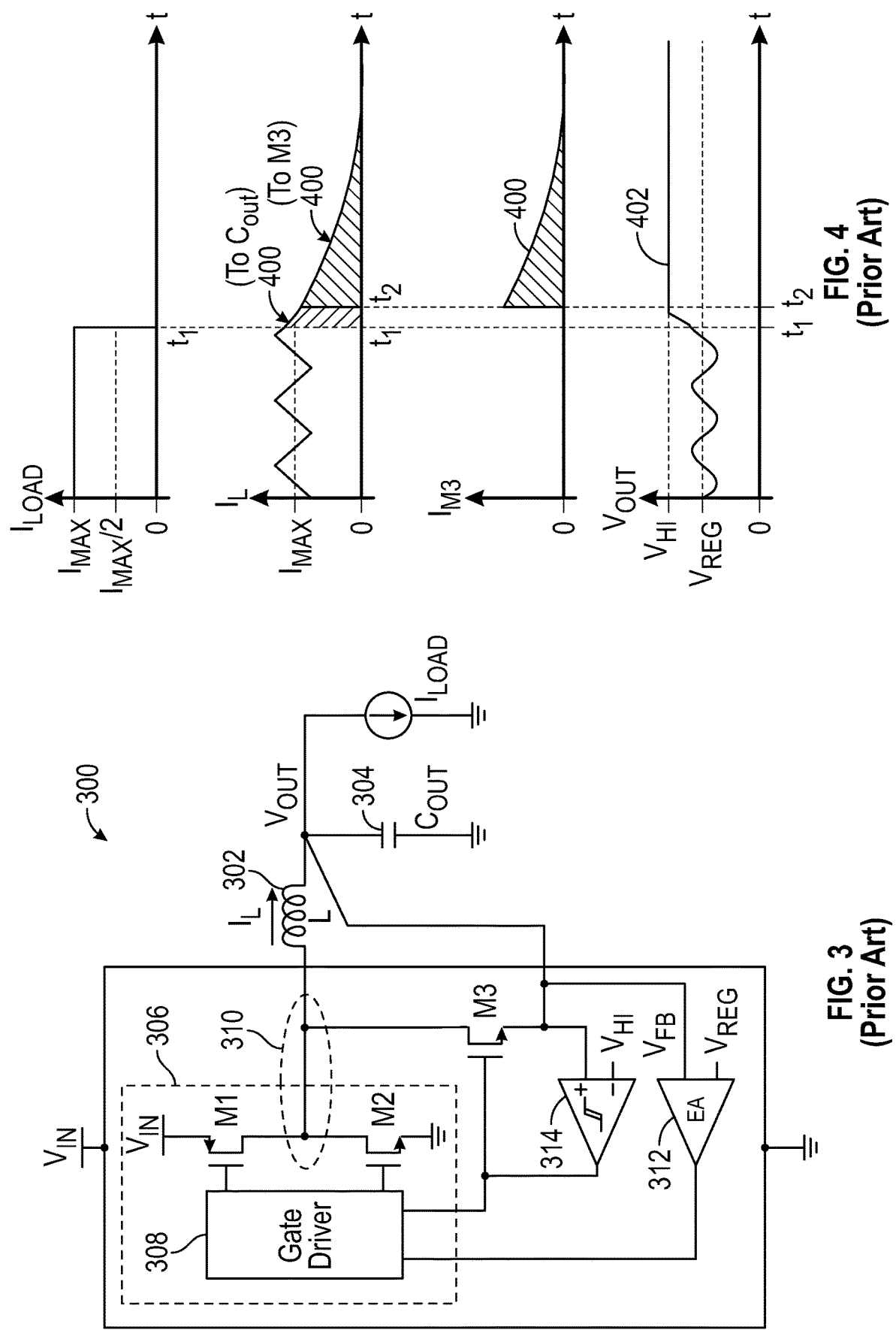
FIG. 3 is a schematic of another example of a voltage regulator circuit.
FIG. 4 illustrates current and voltage waveforms for the voltage regulator circuit of FIG. 3 when subjected to a load dump.

FIG. 3 is a schematic of another example of a voltage regulator circuit 300. The circuit includes a top-gate transistor M1, a bottom-gate transistor M2, and an inductor 302(L). In the example, the transistors M1 and M2 are shown as field-effect transistors (FETs), but are not limited to FETs. The voltage regulator circuit 300 can include an output capacitor 304 ($C_{OUT}$) electrically coupled to an output node and can supply an output voltage $V_{OUT}$ to an output load. The voltage regulator circuit 300 includes a switching circuit 306 having a gate driver 308 and including the transistors M1 and M2. The gate driver 308 is configured (e.g., by logic circuitry) to use a clock signal to provide a switching duty cycle that includes a charge portion and a discharge portion. The voltage regulator circuit 300 receives electrical energy during the charge portion of the switching duty cycle.

The inductor 302 can be coupled between the output capacitor 304 and a switching circuit node 310. The bottom-gate transistor M2 can be electrically coupled between the switching circuit node 310 and circuit ground, and the top-gate transistor M1 can be electrically coupled between the switching circuit node 310 and an input node that is electrically coupled to an input voltage $V_{IN}$.

During the charge portions of successive cycles, the transistor M1 is turned ON or activated to raise the voltage of the switching circuit node 310 almost to the input voltage $V_{IN}$. This initial activation drives a gradually increasing current through the inductor 302 and to the output capacitor 304 and load. During the discharge portion of the switching duty cycles, the transistor M2 is turned ON to pull the switching circuit node 310 almost to circuit ground. This second activation provides a gradually declining current from the energy stored in the inductor 302 to the output capacitor 304 and load.

The duration of the charge portion of the switching duty cycle can be automatically adjusted to maintain the output voltage $V_{OUT}$ at a specified level. The adjustment can be accomplished using a circuit feedback loop that includes an error amplifier circuit 312. The error amplifier circuit 312 generates an error signal representative of a difference between a target voltage value and the voltage $V_{OUT}$ at the output node of the voltage regulator circuit 300. The output voltage can be scaled (e.g., using a resistive divider) to provide a scaled representation of the output voltage to the error amplifier circuit 312 instead of the actual output voltage as a feedback voltage. The error amplifier circuit 312 compares the feedback voltage ($V_{FB}$) with a voltage reference ($V_{REG}$) to generate the error signal. Voltage $V_{REG}$ can be the desired regulated output voltage or a scaled voltage derived from the desired regulated output voltage.

The switching circuit 306 can include logic circuits to implement pulse width modulation (PWM) switching control. The switching circuit 306 sets the durations of the charge portion and discharge portion of the switching duty cycle according to the output voltage. For example, the switching circuit 306 can turn ON the top-gate transistor M1 for a duration based on the comparison of the error signal and a reference waveform signal and then activate the bottom-gate transistor M2 for the remainder of each period of the clock signal.

Activation of the M1 transistor generates a gradually increasing current in the inductor and activation of the M2 transistor generates a gradually decreasing current in the inductor during each switching duty cycle. The increasing and then decreasing current maintains the feedback voltage at a value substantially equal to the reference voltage $V_{REF}$. This activation sequence maintains the output voltage $V_{OUT}$ at the output port at the desired level regardless of the current demand at the load.

In the example shown in FIG. 3, the circuit topology and the target voltage value generate a regulated voltage for $V_{OUT}$ that is less than the voltage at the input $V_{IN}$ of the voltage regulator circuit (e.g., a buck regulator circuit). Other examples can include, among other things, voltage regulator circuit topologies to generate a regulated $V_{OUT}$ that is greater than $V_{IN}$ (e.g., a boost regulator circuit), and circuit topologies to generate a regulated $V_{OUT}$ that can be either less than or greater than $V_{IN}$ (e.g., a buck-boost regulator circuit).

An output load transient in the negative direction (e.g., a load dump in which the load is removed and the load current $I_{LOAD}$ is reduced to zero) of a DC-DC voltage regulator typically results in a positive voltage transient on the regulated output voltage $V_{OUT}$. This is due to a) finite response time of the voltage regulator to correct the amount of current delivered to the load and b) the combined near-instantaneous effects of electrical series resistance (ESR) and electrical series inductance (ESL) in the output capacitor. This problem is exacerbated for inductor-based DC-DC regulators where the inductor current $I_L$ cannot change instantly, and inductor current typically continues to be delivered to the output capacitor for additional cycles until the current can be reduced to zero. This continued delivery of inductor current to the reduced load causes the regulated output voltage to increase further, which risks violating output voltage specifications; especially if the application requires tight control of the output voltage. This positive voltage transient may cause a system shutdown due to tripping an overvoltage monitoring circuit, or worse, may damage circuits connected to the output node due to overvoltage stress.

To divert the inductor current, the voltage regulator circuit 300 includes a shunt circuit that diverts the inductor current away from the output node and the output capacitor when the output voltage exceeds a specified maximum output voltage. The shunt circuit includes a transistor M3 connected in parallel to the inductor 302. The transistor M3 functions as a shunt switch controlled by a hysteretic comparator 314. The output of comparator 314 is active or high when the output voltage rises to a specified maximum output voltage value ($V_{HI}$). Because of its hysteresis, the output of the comparator 314 does not return to inactive or low until the output voltage falls to a value lower than $V_{HI}$ (e.g., the desired regulated voltage level $V_{REG}$).

FIG. 4 illustrates current and voltage waveforms for the voltage regulator circuit of FIG. 3 when subjected to a load dump. The top graph illustrates the load current $I_{LOAD}$ (y-axis) with respect to time (x-axis). The graph immediately below the top graph illustrates the inductor current $I_L$ (y-axis) of the inductor L in FIG. 3 with respect to time (x-axis). The graph immediately above the bottom graph illustrates the current $I_{M3}$ (y-axis) through the transistor M3 in FIG. 3 with respect to time (x-axis). The bottom graph illustrates the output voltage $V_{OUT}$ (y-axis) with respect to time (x-axis).

The voltage regulator circuit 300 of FIG. 3 is subject to the same load dump transient occurring at time $t_1$ as in FIG. 2. The waveforms for the inductor current $I_L$ and the output voltage $V_{OUT}$ prior to time $t_1$ are also the same as in FIG. 2. Immediately after time $t_1$, all inductor current 400 (including the DC component, $I_{MAX}$) is initially delivered to the output capacitor $C_{OUT}$ causing $V_{OUT}$ to initially rise. However, when the output voltage $V_{OUT}$ rises to the voltage $V_{H1}$ (shown at time $t_2$), the hysteresis comparator 314 of FIG. 3 trips and turns on the transistor M3. Inductor current $I_L$ is then diverted away from the output capacitor $C_{OUT}$ and instead circulates in the transistor M3 (the "load dump shunt").

While the transistor M3 is ON, the main control loop transistors M1 and M2 should be OFF. With the transistor M3 ON, the inductor current $I_L$ can be brought down to zero with no further increase in the output voltage 402. Because the circulating inductor current $I_L$ is not going to the output capacitor $C_{OUT}$, it does not have to get to zero quickly. The speed with which the inductor current $I_L$ decays to zero can depend on the sizing of the transistor M3. A smaller M3 (e.g., higher $R_{DS(ON)}$) speeds up the decay to zero and is less costly in terms of silicon die area, but the transistor M3 should not be too small because it must dissipate the energy E stored in the inductor ($E=\frac{1}{2}LI_{MAX}^2$).

Additionally, if the drop across the transistor M3 exceeds the voltage $V_{OUT}$ plus a diode drop, then the body diode of the transistor M2 will turn ON, limiting the voltage drop across the transistor M3 and potentially putting $C_{OUT}$ back in the current loop. Decay follows an exponential curve due to the changing current times resistance (I×R) drop in the transistor M3. An example of a good performance compromise between cost and energy dissipation is to size the transistor M3 to be about 5-10% of the size of M2. The low hysteresis voltage level of comparator 314 should be set so that if the output voltage subsequently falls to near the target voltage value $V_{REG}$ (due to leakage or to a new load turning on), the transistor M3 is turned OFF and normal control loop operation can resume.

Figure 5:
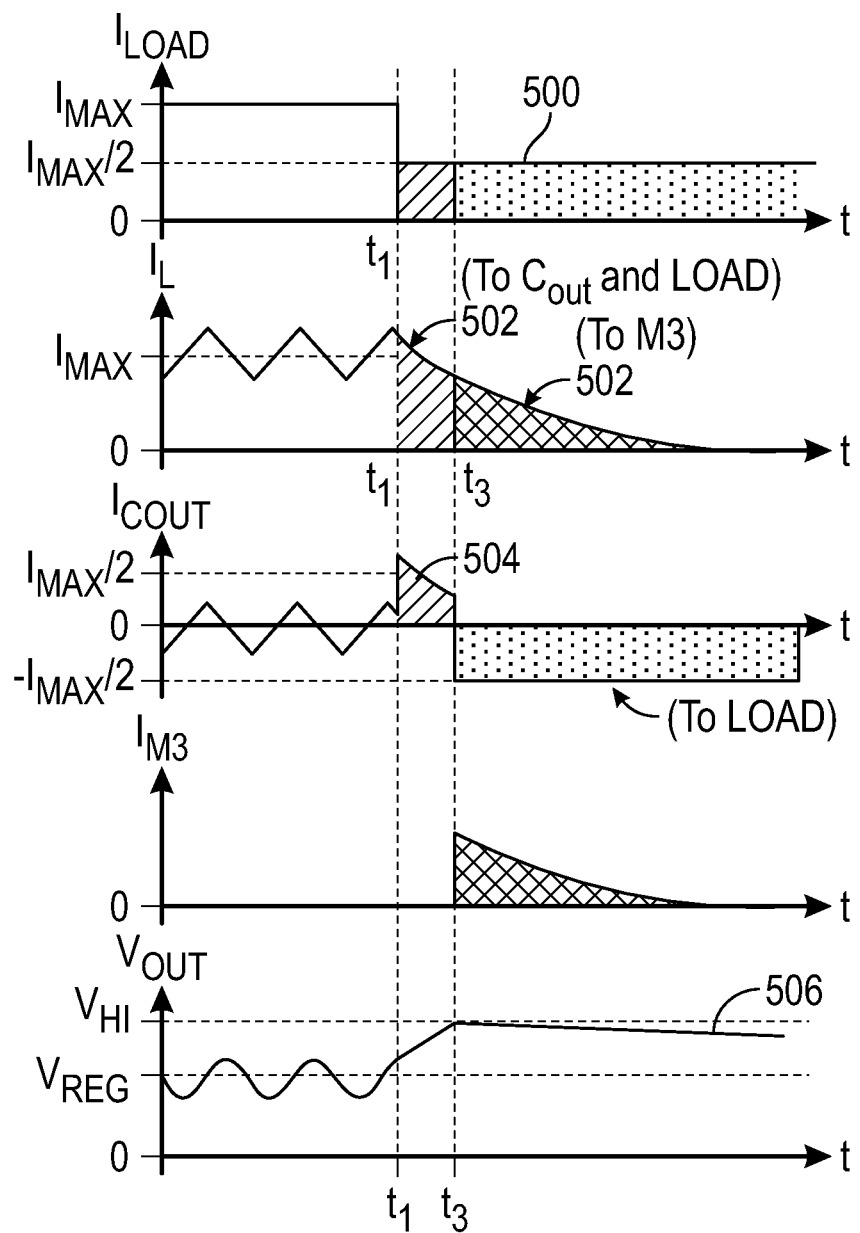
FIG. 5 illustrates current and voltage waveforms for the voltage regulator circuit of FIG. 3 when subjected to a partial load dump.

FIG. 5 illustrates current and voltage waveforms for the voltage regulator circuit of FIG. 3 when subjected to a partial load dump. The top graph illustrates the load current $I_{LOAD}$ (y-axis) with respect to time (x-axis). The graph immediately below the top graph illustrates the inductor current $I_L$ (y-axis) of the inductor L in FIG. 3 with respect to time (x-axis). The middle graph illustrates the output capacitor current $I_{COUT}$. The graph immediately above the bottom graph illustrates the current $I_{M3}$ (y-axis) through the transistor M3 in FIG. 3 with respect to time (x-axis). The bottom graph illustrates the output voltage $V_{OUT}$ (y-axis) with respect to time (x-axis).

In the example of FIG. 5, the partial load dump at time $t_1$ results in the load current $I_{LOAD}$ 500 stepping down from $I_{MAX}$ to $I_{MAX}/2$. The inductor current $I_L$ 502 decays toward zero. As seen at 504, the load is drawing current $I_{COUT}$ from the output capacitor from time $t_1$ to $t_3$. With the partial load dump, the output voltage 506 can take longer to reach the $V_{HI}$ threshold, when compared to FIG. 4. However, significant differences in the $V_{OUT}$ waveform are noticeable when the ESR of the output capacitor is considered.

Figures 6, 7:
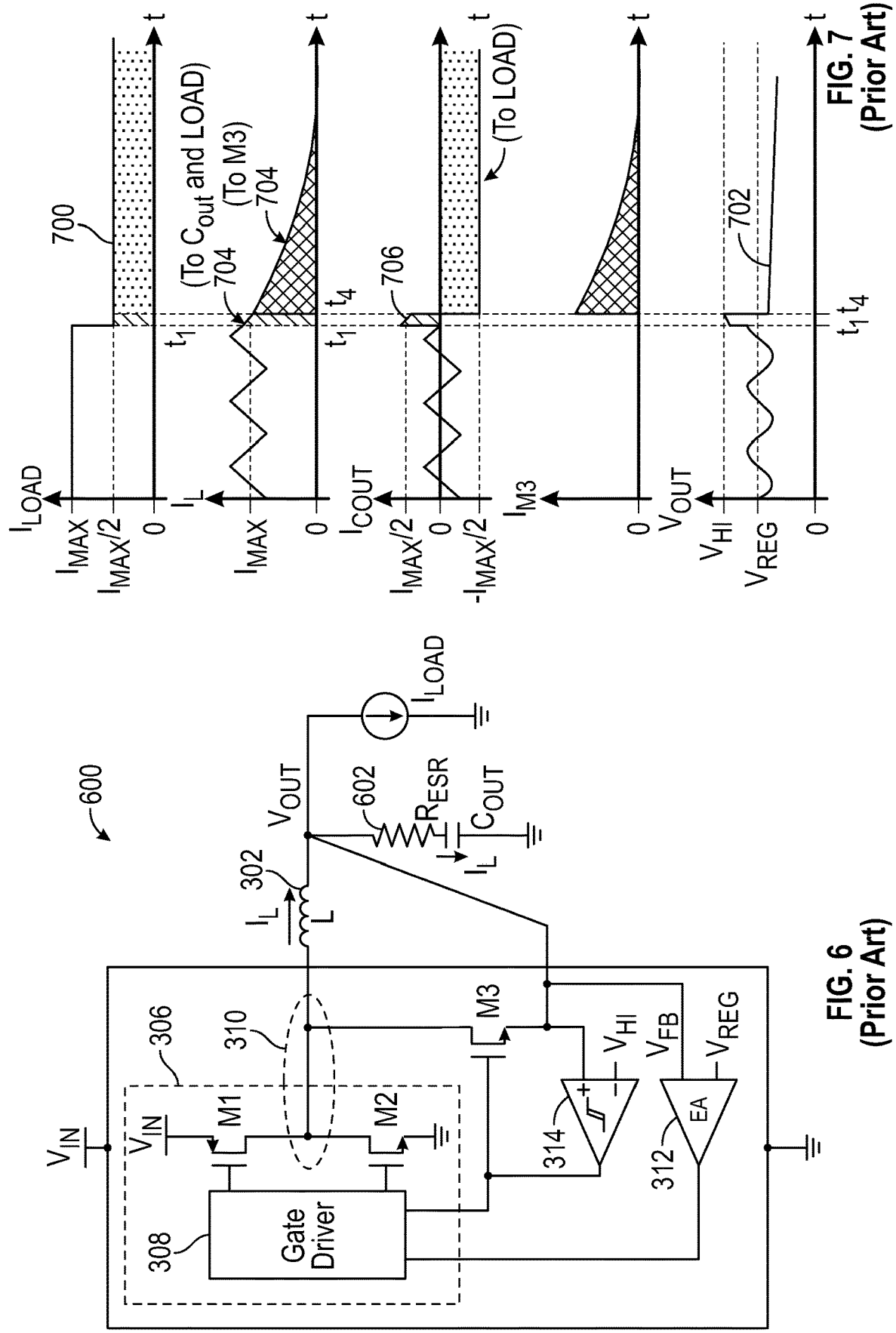
FIG. 6 is a schematic of an example of the voltage regulator circuit of FIG. 3 with ESR in the output capacitor.
FIG. 7 illustrates current and voltage waveforms for the voltage regulator circuit of FIG. 6 when subjected to a partial load dump.

FIG. 6 is a schematic of an example of the voltage regulator circuit of FIG. 3 with ESR in the output capacitor. Many of the components of the voltage regulator circuit 600 in FIG. 6 are similar to the components of the voltage regulator circuit 300 of FIG. 3 and, for purposes of conciseness, will not be described again.

As seen in FIG. 6, the voltage regulator circuit 600 includes the ESR 602 in the output capacitor $C_{OUT}$. The present inventors have recognized that, in some scenarios, the ESR (and the ESL) of the output capacitor $C_{OUT}$ can undesirably affect the performance of the current shunt switch solution of FIG. 3.

FIG. 7 illustrates current and voltage waveforms for the voltage regulator circuit 600 of FIG. 6 when subjected to a partial load dump. The top graph illustrates the load current $I_{LOAD}$ (y-axis) with respect to time (x-axis). The graph immediately below the top graph illustrates the inductor current $I_L$ (y-axis) of the inductor L in FIG. 6 with respect to time (x-axis). The middle graph illustrates the output capacitor current $I_{COUT}$. The graph immediately above the bottom graph illustrates the current $I_{M3}$ (y-axis) through the transistor M3 in FIG. 6 with respect to time (x-axis). The bottom graph illustrates the output voltage $V_{OUT}$ (y-axis) with respect to time (x-axis).

A partial load dump at time $t_1$ results in the load current $I_{LOAD}$ 700 stepping down from $I_{MAX}$ to $I_{MAX}/2$. The output voltage $V_{OUT}$ 702 goes high at time $t_1$ and trips the hysteresis comparator 314 at time $t_4$ in FIG. 6. When the transistor M3 turns ON at time $t_4$, the inductor current $I_L$ (704) is redirected to flow through the transistor M3 instead of flowing to the output, and the output capacitor $C_{OUT}$ must provide all the remaining load current 706, which in this case is equal to $I_{MAX}/2$. When this occurs, the output voltage 702 immediately drops at time $t_4$ because the direction of the current in the ESR of the output capacitor reverses from positive to negative. Depending on the size of the remaining output current (after time $t_4$) and the ESR value, this negative excursion on the output voltage can be quite large, and potentially exceed the allowable low voltage tolerance at the output voltage $V_{OUT}$. If the output voltage $V_{OUT}$ drops out of the hysteresis window of the comparator 314 of FIG. 6, then the comparator 314 trips again and turns OFF the transistor M3 and the shunt path. This can lead to subsequent erratic and undesirable tripping and untripping of comparator 314.

One possible solution is to make the hysteresis of the comparator 314 such that the low threshold is below the regulated voltage $V_{REG}$. In this way, the transistor M3 is now only turned OFF when the output voltage $V_{OUT}$ falls to some value below the regulated voltage $V_{REG}$, which can be adjusted depending on the value of the ESR resistance $R_{ESR}$. However, this would force the hysteresis value to be specifically adjusted for a specific ESR resistance $R_{ESR}$ value of the output capacitor, which usually is not tightly controlled. Having to account for the largest value could require the low threshold to be set much lower than the regulated voltage $V_{REG}$. This would, in turn, force a large tolerance on the output voltage $V_{OUT}$ negative excursion, which can degrade guaranteed output voltage accuracy during transients.

Furthermore, such hysteretic behavior in turning ON and OFF the transistor M3 could engage the shunt switch multiple times in some unpredictable burst of frequency during a single negative load step event.

As mentioned above, to ensure smooth transitions when engaging or disengaging the current shunt switch, the present inventors have recognized that an amplifier circuit can be included and coupled with a control node of a current shunt switch. The amplifier circuit can adjust a voltage on the control node of the current shunt switch to control an amount of inductor current diverted away from the output node. These techniques can minimize the amount and duration of negative output voltage excursion, which can be dependent on the specific ESL and ESR values of the output voltage capacitor, for the cases when the final value of the step-down load-transient is not zero. In this manner, the techniques of this disclosure can improve a positive output voltage response caused by an output load transient in the negative direction.

Figure 8:
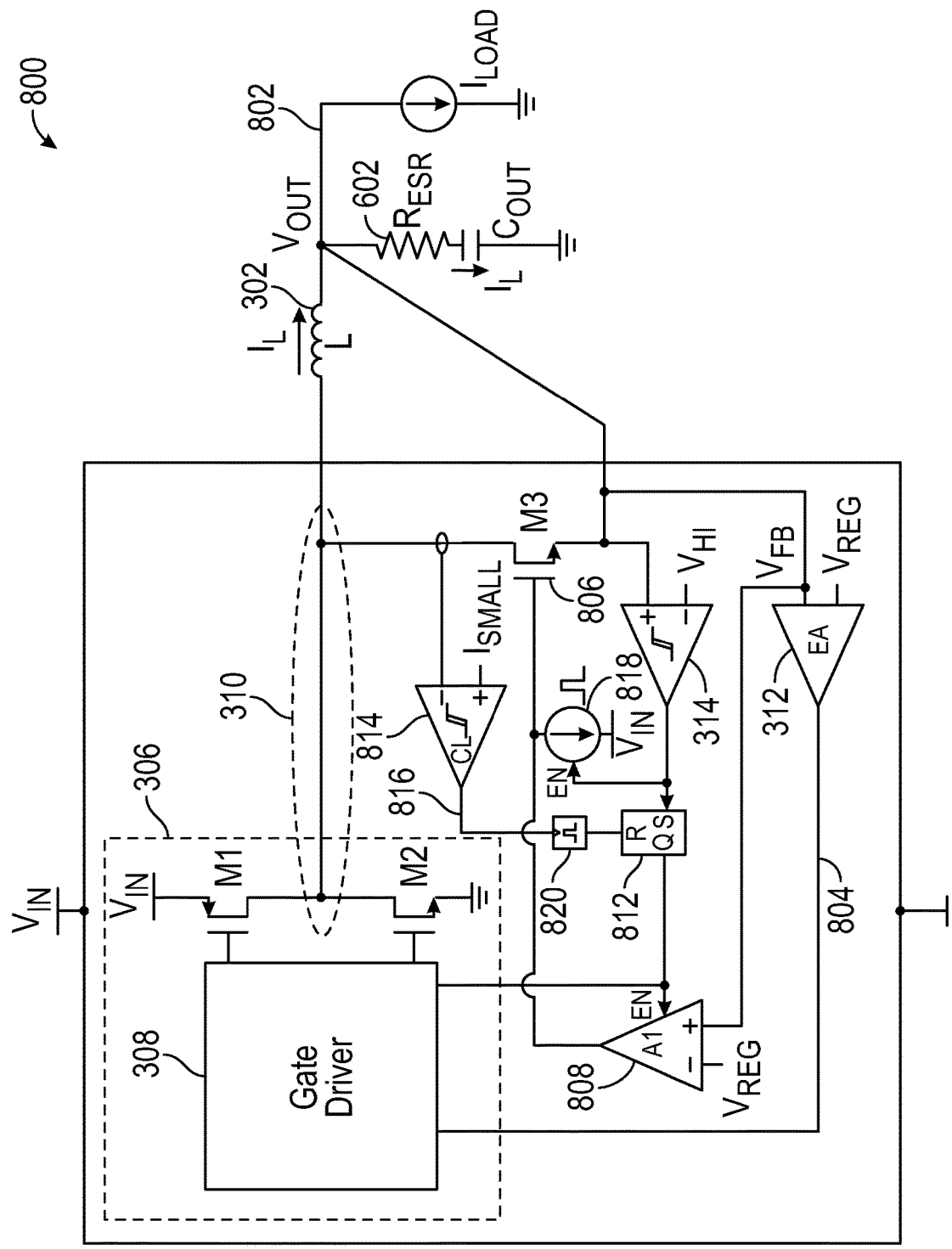
FIG. 8 is a schematic of an example of a voltage regulator circuit that can implement various techniques of this disclosure.

FIG. 8 is a schematic of an example of a voltage regulator circuit that can implement various techniques of this disclosure. Many of the components of the voltage regulator circuit 800 in FIG. 8 are similar to the components of the voltage regulator circuit 600 of FIG. 6 and, for purposes of conciseness, will not be described again.

The voltage regulator circuit 800 in FIG. 8 can include a switching circuit 306 to adjust a switching duty cycle to regulate the output voltage $V_{OUT}$ at an output node 802 of the voltage regulator circuit using an error signal 804 representative of a difference between a target voltage value ($V_{REG}$) and the output voltage ($V_{FB}$). In a buck configuration, such as shown in FIG. 8, the switching circuit 306 can include a top switch circuit, such as including the transistor M1, coupled with the switching circuit node 310 and the input node $V_{IN}$ of the voltage regulator circuit. The switching circuit 306 can further include a bottom switch circuit, such as including the transistor M2, coupled with the switching circuit node 310, and a circuit ground node, where the shunt switch M3 is coupled in parallel to the inductor and coupled with the switching circuit node 310 and the output node.

The voltage regulator circuit 800 can include an inductor 302 coupled with the switching circuit 306 and configured to provide an inductor current $I_L$ to the output node 802.

As described above with respect to FIG. 6, the voltage regulator circuit 800 can include a shunt circuit coupled in parallel to the inductor. The shunt circuit can divert the inductor current away from the output node when the output voltage exceeds a specified maximum output voltage. The shunt circuit can include a shunt switch M3 coupled in parallel to the inductor 302, the shunt switch including a control node 806.

Using various techniques of this disclosure, the shunt circuit can be controlled by a shunt circuit control circuit that can include an amplifier circuit 808 and a comparator circuit 314. The amplifier circuit 808 can have an output coupled with the control node 806 of the shunt switch M3.

The comparator circuit 314, e.g., a hysteretic comparator, can compare the output voltage ($V_{FB}$) to the specified maximum output voltage ($V_{HI}$). The comparator circuit 314 can enable the amplifier circuit 808 when the output voltage exceeds the specified maximum output voltage to adjust a voltage on the control node 806 of the shunt switch M3 to control an amount of the inductor current $I_L$ diverted away from the output node. The comparator circuit 314 can disable the amplifier circuit 808 after enabling the shunt switch M3 when the output voltage decreases to the target voltage.

In some examples, the shunt circuit control circuit can include a latch circuit 812, e.g., an SR latch, coupled with an output of the comparator circuit 314 and to an enable input EN of the amplifier circuit 808.

In some examples, the shunt circuit control circuit can include a current comparator circuit 814, e.g., a hysteretic current comparator, to compare a current through the shunt switch M3 to a target current $I_{SMALL}$ and output a reset signal 816 to the latch circuit 812 when the current through the shunt switch M3 decreases below the target current.

In some examples, the shunt circuit control circuit can include a current source circuit 818, e.g., a one-shot current pull-up, coupled with the control node 806 of the shunt switch M3 and to the output of the comparator circuit 314. The comparator circuit 314 can enable the current source circuit 818 when the output voltage exceeds the specified maximum output voltage.

In some examples, the voltage regulator circuit 800 can include a feedback circuit including an error amplifier circuit 312 to generate an error signal 804 representative of a difference between a target voltage ($V_{REG}$) and the output voltage ($V_{FB}$).

In some examples, the voltage regulator circuit 800 can include a one-shot voltage pulse generator 820 coupled between the output of the current comparator circuit 814 and the latch circuit 812.

In the example shown in FIG. 8, both amplifiers 312 and 808 share the same inputs of $V_{FB}$ and $V_{REG}$. The error amplifier circuit 312 and the amplifier circuit 808 have separate input stage circuits and output stage circuits.

In some examples, the voltage regulator circuit 800 can include an output capacitor $C_{OUT}$ coupled with the output node, where the shunt circuit can divert the inductor current away from the output capacitor when the output voltage exceeds the specified maximum output voltage.

When the output voltage rises to a specified maximum output voltage value ($V_{HI}$), the output of the comparator circuit 314 immediately turns the transistor M3 ON by engaging the short duration one-shot current pull-up 818 at the gate 806 of the transistor M3. At the same time, the amplifier 808 is also enabled by setting the output of the SR latch HIGH (using the enable line EN of the amplifier 808). The function of the amplifier 808 is to immediately regulate the gate voltage of the transistor M3 (from the initially fully ON condition set by the one-shot current) to divert (shunt) only enough inductor current ($I_L$-$I_{LOAD}$) away from $C_{OUT}$ to maintain the output voltage at its desired regulation value ($V_{REG}$). The initial fully ON condition of the transistor M3 is important to ensure that the output voltage does not increase beyond the voltage $V_{HI}$.

In this example, while the transistor M3 is ON, the transistor M1 is OFF and the transistor M2 is turned ON (in contrast with FIG. 3 where both the transistor M1 and the transistor M2 are OFF when the transistor M3 is ON). This can be desirable because some of the inductor current $I_L$ (matching the final value of the output current $I_{LOAD}$) is still flowing to the output. The transistor M2 can be turned ON to provide a current return path, thus preventing the body diode of the transistor M2 from being forced ON.

When the transistor M3 is ON, the current flowing through it slowly decays. When the shunt current drops down to a small value ($I_{SMALL}$), the current comparator 814 turns OFF the amplifier 808 via the positive (low-to-high) edge sensitive one-shot voltage pulse generator 820 connected at its output driving the reset line of the latch circuit 812. The shunt switch M3 can be immediately turned OFF, and normal control loop operation can resume (a shunt "exit" condition).

With this proposed technique of regulating the output voltage at $V_{REG}$ when the transistor M3 is ON, the optimal amount of inductor current $I_L$ can be diverted away from the output capacitor to maintain the output voltage at $V_{REG}$.

It should be noted that the speed with which the inductor current decays with this technique no longer depends solely on the sizing of the transistor M3 because the switching node 310 is now fixed near ground with the transistor M2 turned ON and with the output voltage regulated at $V_{REG}$. The transistor M3 should be sized large enough such that with its gate driven to the highest voltage (completely ON), it can shunt the maximum allowable inductor current with $V_{REG}$ volts across it. With this criterion satisfied, the amplifier 808 can adjust the gate voltage of the transistor M3 such that the transistor M3 only shunts excess inductor current above the output current requirement ($I_L$-$I_{LOAD}$).

With this technique, the hysteresis of the comparator 314 can again be set so that if the output voltage subsequently falls to some small value below $V_{REG}$ (due to leakage or a new load turning on), the transistor M3 is turned OFF and normal control loop operation resumes.

Figure 14:
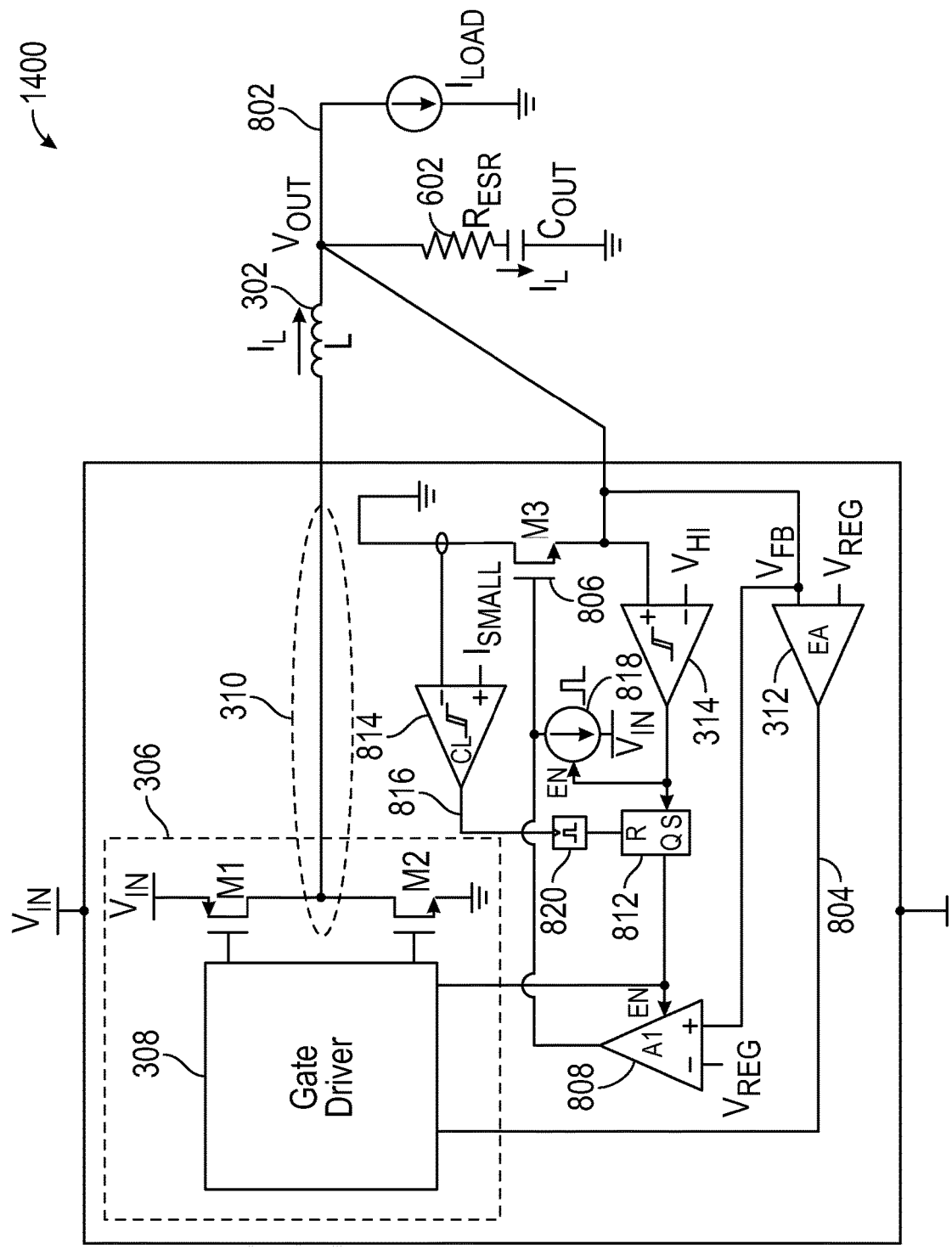
FIG. 14 is a schematic of another example of a voltage regulator circuit that can implement various techniques of this disclosure.

FIG. 14 is a schematic of another example of a voltage regulator circuit that can implement various techniques of this disclosure. Many of the components of the voltage regulator circuit 1400 in FIG. 14 are similar to the components of the voltage regulator circuit 800 of FIG. 8 and, for purposes of conciseness, will not be described again. Unlike in the voltage regulator circuit 800 of FIG. 8, the shunt switch M3 in FIG. 14 is not coupled to the switching circuit node 310. As such, the shunt switch M3 path to ground, for example, is not via the transistor M2, as in FIG. 8, but instead direct to ground. The operation of the voltage regulator circuit 1400 in FIG. 14 is otherwise similar to the voltage regulator circuit 800 of FIG. 8.

Figure 9:
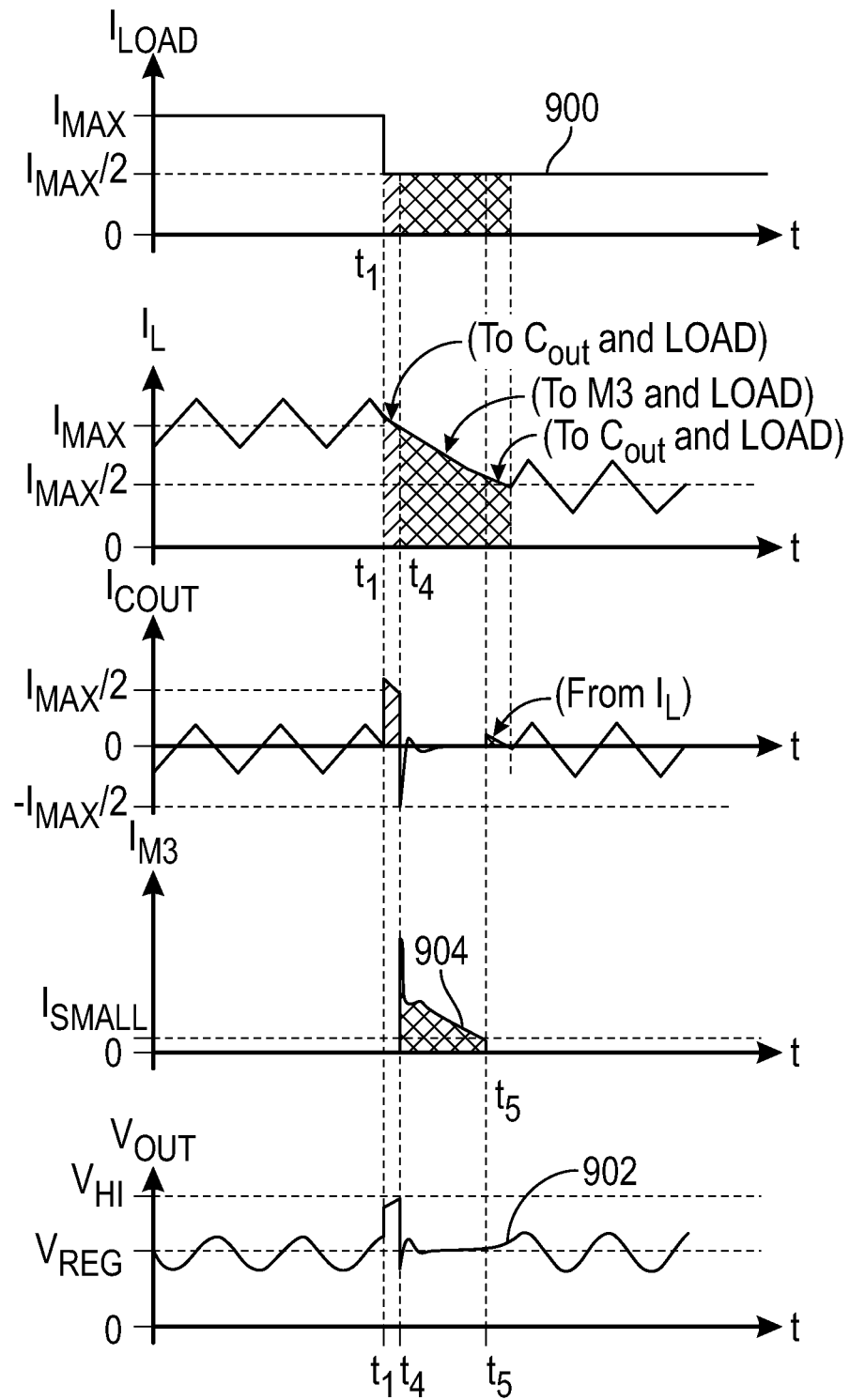
FIG. 9 illustrates current and voltage waveforms for the voltage regulator circuit of FIG. 8 when subjected to a partial load dump.

FIG. 9 illustrates current and voltage waveforms for the voltage regulator circuit 800 of FIG. 8 when subjected to a partial load dump. The top graph illustrates the load current $I_{LOAD}$ (y-axis) with respect to time (x-axis). The graph immediately below the top graph illustrates the inductor current $I_L$ (y-axis) of the inductor L in FIG. 8 with respect to time (x-axis). The middle graph illustrates the output capacitor current $I_{COUT}$. The graph immediately above the bottom graph illustrates the current $I_{M3}$ (y-axis) through the transistor M3 in FIG. 8 with respect to time (x-axis). The bottom graph illustrates the output voltage $V_{OUT}$ (y-axis) with respect to time (x-axis).

A partial load dump at time $t_1$ results in the load current IkOAD 900 stepping down from $I_{MAX}$ to $I_{MAX}/2$. The output voltage $V_{OUT}$ 902 goes high after time $t_1$ due to the ESR of the output capacitor and trips the hysteresis comparator 314 in FIG. 8 when the voltage exceeds $V_{HI}$. The output of the comparator 314 in FIG. 8 turns the transistor M3 ON fully, using the current source circuit 818. In addition, the output of the comparator 818 immediately enables the amplifier 808 using the latch circuit 812 so that the amplifier 808 begins regulating the gate of the transistor M3.

The transistor M2 is ON and coupled to ground and, as such, the voltage across the inductor 302 is $V_{OUT}$, resulting in a fixed inductor current decay rate as seen at 904. Once the current $I_{M3}$ reaches $I_{SMALL}$ at time $t_5$, the current comparator 814 can trip and reset the latch circuit 812 in FIG. 8.

The shunt circuit is now disabled, resulting in the current $I_{SMALL}$ being delivered to the output node and a very small positive excursion immediately after time $t_5$ in the output voltage 902. The output voltage 902 is much closer to the regulated voltage $V_{REG}$ than was the case in FIG. 7. In addition, with the techniques of FIG. 8, no extra output capacitance is required, thereby maintaining a small footprint and reducing cost.

Figure 10:
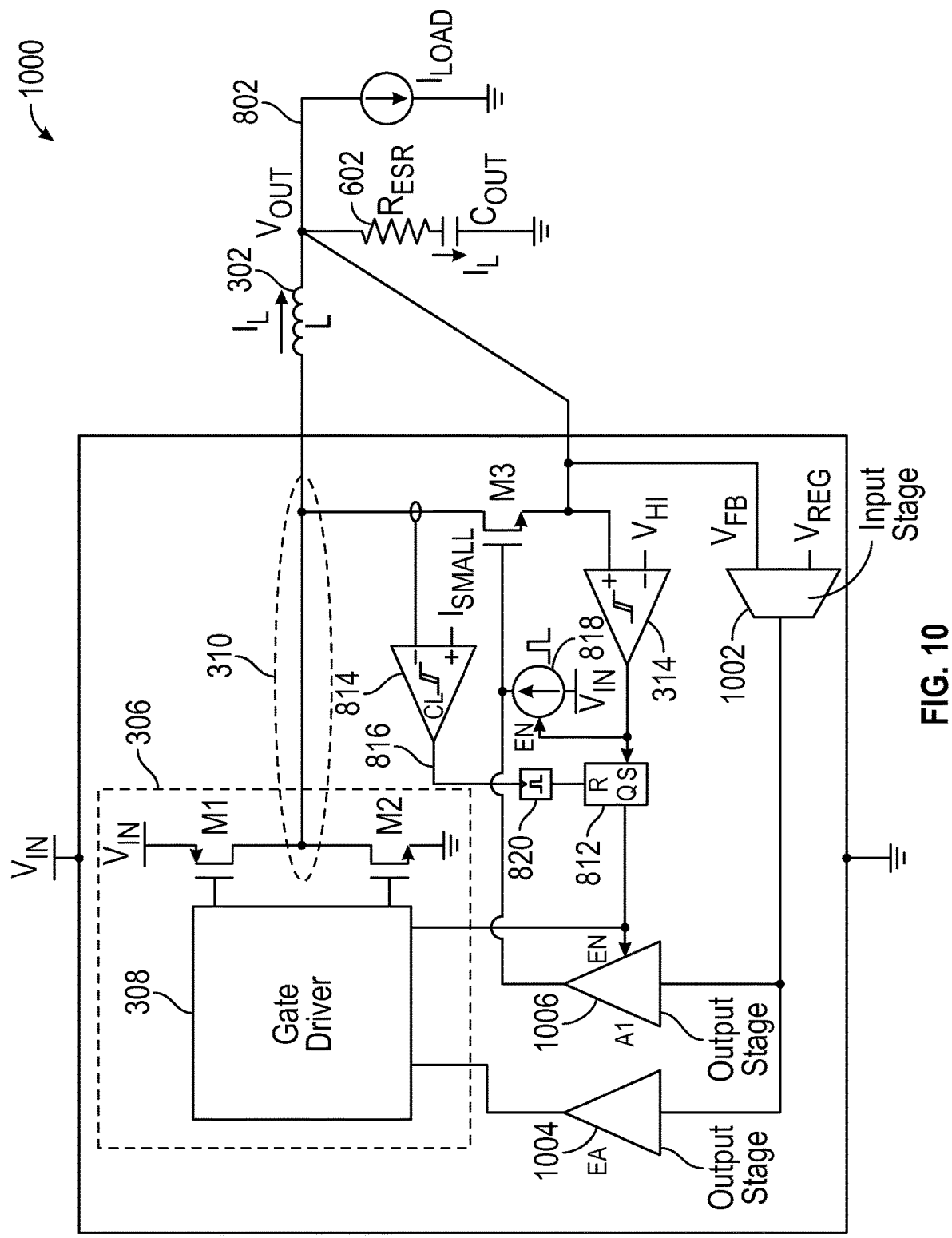
FIG. 10 is a schematic of another example of a voltage regulator circuit that can implement various techniques of this disclosure.

FIG. 10 is a schematic of another example of a voltage regulator circuit that can implement various techniques of this disclosure. Many of the components of the voltage regulator circuit 1000 in FIG. 10 are similar to the components of the voltage regulator circuit 800 of FIG. 8 and, for purposes of conciseness, will not be described again.

In the example shown in FIG. 8, the error amplifier circuit 312 and the amplifier circuit 808 have separate input stage circuits and output stage circuits. However, because the error amplifier circuit 312 and the amplifier circuit 808 share the same inputs of $V_{FB}$ and $V_{REG}$, the error amplifier circuit 312 of FIG. 8 and the amplifier circuit 808 of FIG. 8 can share an input stage circuit. Such a configuration is shown in FIG. 10, with a shared input stage circuit 1002, and separate output stage circuits for the error amplifier 1004 (performing the function of the error amplifier circuit 312 of FIG. 8) and the amplifier circuit 1006 (performing the function of the amplifier circuit 808 of FIG. 8).

Figure 11:
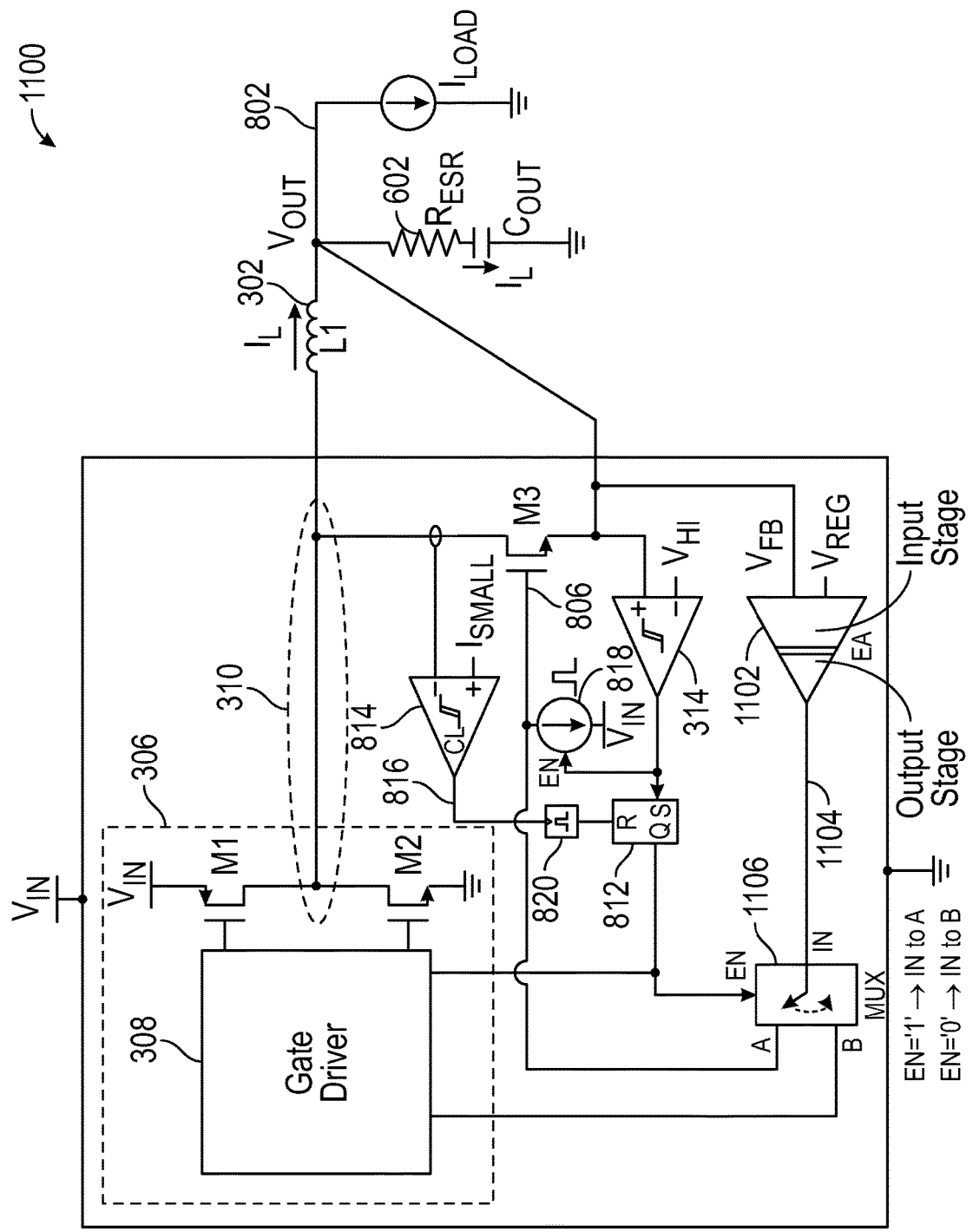
FIG. 11 is a schematic of another example of a voltage regulator circuit that can implement various techniques of this disclosure.

FIG. 11 is a schematic of another example of a voltage regulator circuit that can implement various techniques of this disclosure. Many of the components of the voltage regulator circuit 1100 in FIG. 11 are similar to the components of the voltage regulator circuit 800 of FIG. 8 and, for purposes of conciseness, will not be described again.

In the implementation shown in FIG. 8, there is no time period during which both the error amplifier circuit 312 of FIG. 8 and the amplifier circuit 808 of FIG. 8 need to be operational at the same time. As such, in an alternative configuration, such as shown in FIG. 11, these two amplifiers can be combined into a single amplifier with a multiplexer circuit coupled to the output of the amplifier to drive the different parts of the circuit 1100 at different times depending on the mode of operation.

For example, the error amplifier circuit 312 of FIG. 8 and the amplifier circuit 808 of FIG. 8 can be combined into a single amplifier circuit 1102 (having an input stage and an output stage) and having an output 1104 coupled to a multiplexer circuit 1106. The multiplexer circuit 1106 can use the enable signal from the latch circuit 812 to selectively couple the output of the amplifier circuit 1102 to either the switching circuit ("B" output of the multiplexer circuit) or to the control node of the shunt switch M3 ("A" output of the multiplexer circuit).

Figure 12:
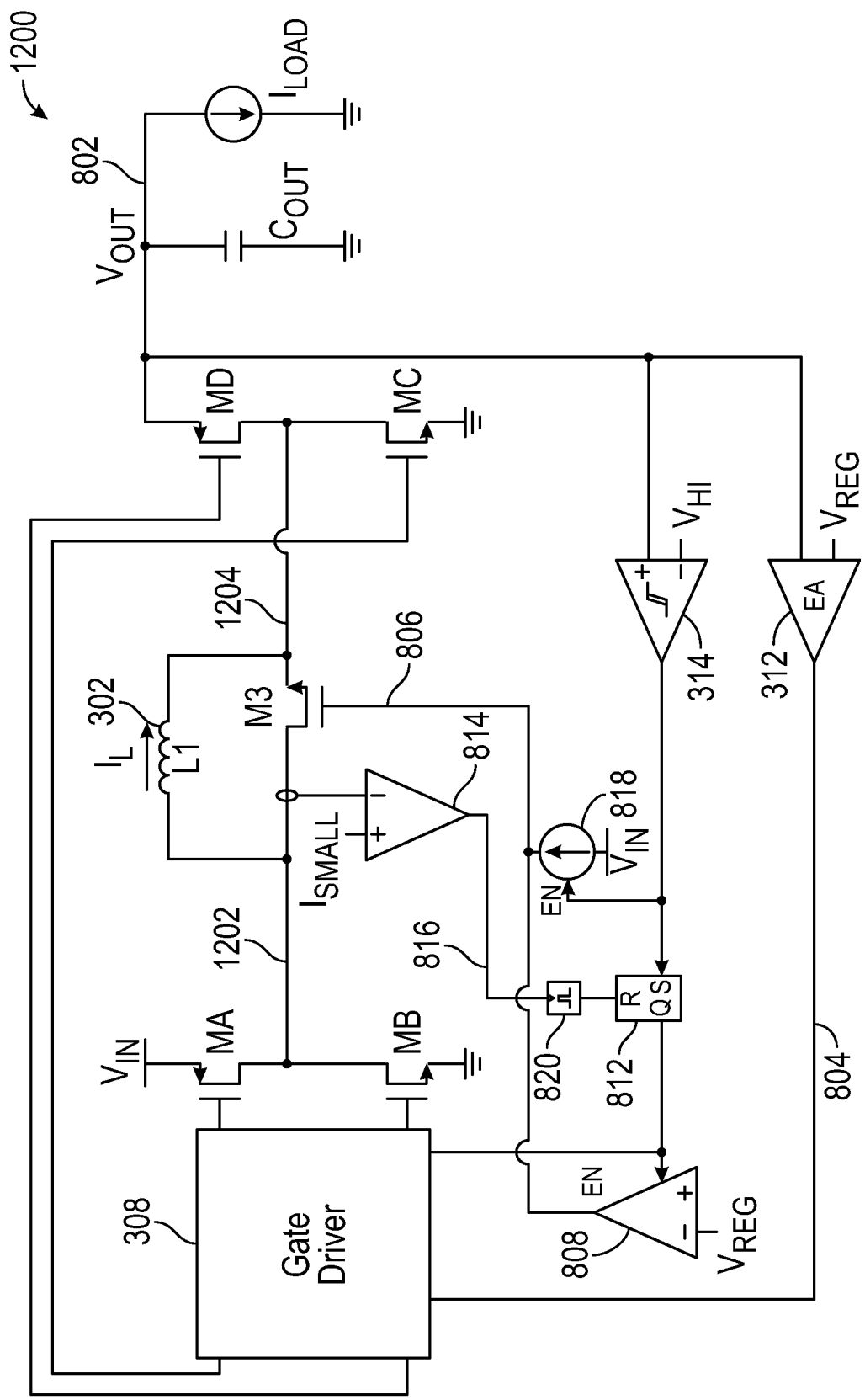
FIG. 12 is a schematic of another example of a voltage regulator circuit that can implement various techniques of this disclosure.

FIG. 12 is a schematic of another example of a voltage regulator circuit that can implement various techniques of this disclosure. Many of the components of the voltage regulator circuit 1200 in FIG. 12 are similar to the components of the voltage regulator circuit 800 of FIG. 8 and, for purposes of conciseness, will not be described again.

In a buck-boost configuration, such as shown in FIG. 12, the switching circuit can include four switch circuits. The switching circuit can include a first switch circuit, such as including the transistor MA, coupled with an input node $V_{IN}$ of the voltage regulator circuit 1200 and a first switching circuit node 1202. The switching circuit can include a second switch circuit, such as including the transistor MB, coupled with the first switching circuit node 1202 and a circuit ground node. The switching circuit can include a third switch circuit, such as including the transistor MC, coupled with a second switching circuit node 1204 and the circuit ground node. The switching circuit can include a fourth switch circuit, such as including the transistor MD, coupled with the second switching circuit node 1204 and the output node. The inductor and the shunt switch M3 can be coupled with the first switching circuit node 1202 and the second switching circuit node 1204.

Figure 13:
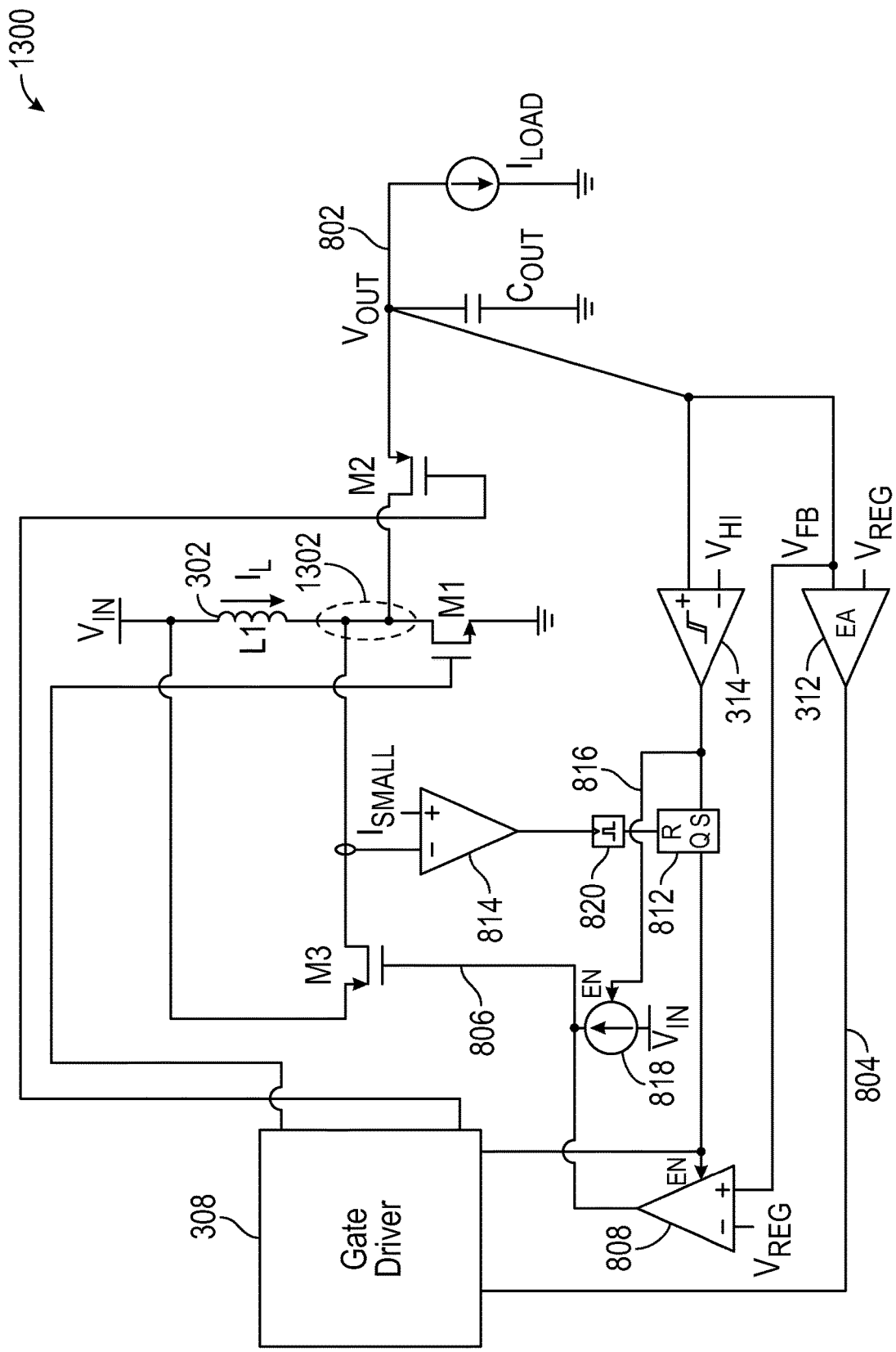
FIG. 13 is a schematic of another example of a voltage regulator circuit that can implement various techniques of this disclosure.

FIG. 13 is a schematic of another example of a voltage regulator circuit that can implement various techniques of this disclosure. Many of the components of the voltage regulator circuit 1300 in FIG. 13 are similar to the components of the voltage regulator circuit 800 of FIG. 8 and, for purposes of conciseness, will not be described again.

In a boost configuration, such as shown in FIG. 13, the inductor 302 can be coupled with the input node $V_{IN}$ of the voltage regulator circuit 1300. The switching circuit can include a first switch circuit, including the transistor M1, coupled with a switching circuit node 1302 and a circuit ground node. The switching circuit can include a second switch circuit, including the transistor M2, coupled with the output node 802 and the switching circuit node 1302. The shunt switch M3 can be coupled in parallel to the inductor 302 and coupled with the switching circuit node 1302 and the input node $V_{IN}$.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The invention claimed is:

1. A voltage regulator circuit comprising:
a switching circuit to adjust a switching duty cycle to regulate an output voltage at an output node of the voltage regulator circuit using an error signal representative of a difference between a target voltage value and the output voltage;
an inductor coupled with the switching circuit and configured to provide an inductor current to the output node;
a shunt circuit to divert the inductor current away from the output node when the output voltage exceeds a specified maximum output voltage, the shunt circuit including a shunt switch having a control node, wherein the shunt circuit is coupled in parallel with the inductor; and
a shunt circuit control circuit including an amplifier circuit and a comparator circuit, the amplifier circuit having an output coupled with the control node of the shunt switch, the comparator circuit to compare the output voltage to the specified maximum output voltage and a target voltage less than the specified maximum output voltage, enable the amplifier circuit when the output voltage exceeds the specified maximum output voltage to adjust a voltage on the control node of the shunt switch to control an amount of the inductor current diverted away from the output node, and disable the amplifier circuit after enabling the shunt switch when the output voltage decreases to the target voltage.

2. The voltage regulator circuit of claim 1, wherein the shunt circuit control circuit includes a latch circuit coupled with an output of the comparator circuit and to an enable input of the amplifier circuit.

3. The voltage regulator circuit of claim 2, wherein the shunt circuit control circuit includes a current comparator circuit to compare a current through the shunt switch to a target current and output a reset signal to the latch circuit when the current through the shunt switch decreases below the target current.

4. The voltage regulator circuit of claim 1, wherein the shunt circuit control circuit includes a current source circuit coupled with the control node of the shunt switch and to the output of the comparator circuit, the comparator circuit to enable the current source circuit when the output voltage exceeds the specified maximum output voltage.

5. The voltage regulator circuit of claim 1, comprising:
a feedback circuit including an error amplifier circuit to generate an error signal representative of a difference between a target voltage and the output voltage, wherein the error amplifier circuit and the amplifier circuit share an input stage circuit.

6. The voltage regulator circuit of claim 1, comprising:
a feedback circuit including an error amplifier circuit to generate an error signal representative of a difference between a target voltage and the output voltage, wherein the error amplifier circuit and the amplifier circuit have separate input stage circuits and output stage circuits.

7. The voltage regulator circuit of claim 1, comprising:
a multiplexer circuit to use an enable signal to selectively couple the output of the amplifier circuit to either the switching circuit or to the control node of the shunt switch.

8. The voltage regulator circuit of claim 1, wherein the inductor is coupled with the output node,
wherein the switching circuit includes:
a top switch circuit coupled with a switching circuit node and an input node of the voltage regulator circuit; and
a bottom switch circuit coupled with the switching circuit node and a circuit ground node;
wherein the shunt switch is coupled in parallel with the inductor and coupled with the switching circuit node and the output node.

9. The voltage regulator circuit of claim 1, wherein the inductor is coupled with an input node of the voltage regulator circuit,
wherein the switching circuit includes:
a first switch circuit coupled with a switching circuit node and a circuit ground node; and
a second switch circuit coupled with the output node and the switching circuit node; and
wherein the shunt switch is coupled in parallel with the inductor and coupled with the switching circuit node and the input node.

10. The voltage regulator circuit of claim 1, wherein the switching circuit includes:
a first switch circuit coupled with an input node of the voltage regulator circuit and a first switching circuit node;
a second switch circuit coupled with the first switching circuit node and a circuit ground node;
a third switch circuit coupled with a second switching circuit node and the circuit ground node; and
a fourth switch circuit coupled with the second switching circuit node and the output node;
wherein the inductor and the shunt switch are coupled with the first switching circuit node and the second switching circuit node.

11. The voltage regulator circuit of claim 1, comprising:
an output capacitor coupled with the output node, the shunt circuit to divert the inductor current away from the output capacitor when the output voltage exceeds the specified maximum output voltage.

12. A method of operating a voltage regulator circuit, the method comprising:
activating and deactivating a switch circuit to charge and discharge an inductor to generate an output voltage and provide an inductor current to an output node of the voltage regulator circuit;
adjusting a switching duty cycle of the switch circuit to regulate the output voltage using an error signal representative of a difference between a target voltage value and the output voltage;
comparing the output voltage to a specified maximum output voltage;
operating a latch circuit to enable an input of an amplifier circuit; and
adjusting, by using the comparison of the output voltage to the specified maximum output voltage, a voltage on a control node of a shunt switch to control an amount of the inductor current diverted away from the output node when the output voltage exceeds a specified maximum output voltage.

13. The method of claim 12, comprising:
comparing a current through the shunt switch to a target current and outputting a reset signal to the latch circuit when the current through the shunt switch decreases below the target current.

14. The method of claim 12, comprising:
enabling a current source circuit when the output voltage exceeds the specified maximum output voltage.

15. The method of claim 12, comprising:
selectively coupling an output of an amplifier circuit to either a switching circuit or to a control node of the shunt switch.

16. A voltage regulator circuit comprising:
a driver circuit to activate and deactivate a switch circuit to charge and discharge an inductor to generate an output voltage and provide an inductor current to an output node of the voltage regulator circuit, the driver circuit to regulate h output voltage at the output node of the voltage regulator circuit using an error signal representative of a difference between a target voltage value and the output voltage;
means for comparing the output voltage to a specified maximum output voltage;
means for adjusting, by using the comparison of the output voltage to the specified maximum output voltage, a voltage on a control node of a shunt switch to control an amount of the inductor current diverted away from the output node when the output voltage exceeds a specified maximum output voltage; and
means for enabling an input of an amplifier circuit, the means for enabling coupled with an output of a comparator circuit and to an enable input of the amplifier circuit.

17. The voltage regulator circuit of claim 16, comprising:
means for comparing a current through the shunt switch to a target current and outputting a reset signal to the means for enabling when the current through the shunt switch decreases below the target current.

18. The voltage regulator circuit of claim 16, wherein the shunt circuit control circuit includes a current source circuit coupled with the control node of the shunt switch and to the output of the comparator circuit, the comparator circuit to enable the current source circuit when the output voltage exceeds the specified maximum output voltage.

19. The voltage regulator circuit of claim 16, comprising:
a feedback circuit including an error amplifier circuit to generate an error signal representative of a difference between a target voltage and the output voltage, wherein the error amplifier circuit and the amplifier circuit share an input stage circuit.

20. The voltage regulator circuit of claim 16, comprising:
a feedback circuit including an error amplifier circuit to generate an error signal representative of a difference between a target voltage and the output voltage, wherein the error amplifier circuit and the amplifier circuit have separate input stage circuits and output stage circuits.

21. The voltage regulator circuit of claim 16, comprising:
a multiplexer circuit to use an enable signal to selectively couple the output of the amplifier circuit to either the switching circuit or to the control node of the shunt switch.

* * * * *

UNITED STATES PATENT AND TRADEMARK OFFICE
CERTIFICATE OF CORRECTION

PATENT NO. : 11,394,301 B1
APPLICATION NO. : 17/175909
DATED : July 19, 2022
INVENTOR(S) : Lisuwandi et al.

Page 1 of 1

It is certified that error appears in the above-identified patent and that said Letters Patent is hereby corrected as shown below:

In the Claims

In Column 15, Line 23, in Claim 9, after "node;", delete "and"

In Column 16, Line 19, in Claim 16, delete "h" and insert --the-- therefor

Signed and Sealed this
Twenty-first Day of March, 2023

Katherine Kelly Vidal
*Director of the United States Patent and Trademark Office*